Sept. 25, 1951     E. WILLIHNGANZ     2,569,361
ELECTROCHEMICAL CELL DIAPHRAGM
Filed June 27, 1947
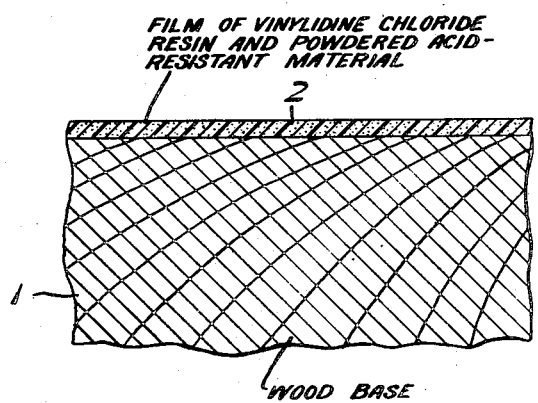
FILM OF VINYLIDINE CHLORIDE RESIN AND POWDERED ACID-RESISTANT MATERIAL
WOOD BASE
INVENTOR
Eugene Willihnganz
BY
Bean, Brooks, Buckley & Bean.
ATTORNEYS Patented Sept. 25, 1951

2,569,361

UNITED STATES PATENT OFFICE 2,569,361

ELECTROCHEMICAL CELL DIAPHRAGM

Eugene Willihnganz, Buffalo, N. Y., assignor to National Battery Company, St. Paul, Minn.

Application June 27, 1947, Serial No. 757,350

5 Claims. (Cl. 136—145)

This invention relates to improvements in electro-chemical cell constructions, such as for example in lead-acid storage batteries and the like. More particularly, the invention relates to an improved type of plate separator for use in such devices, and to methods of manufacture thereof.

In the drawing, the figure is a fragmentary section, on an enlarged scale, of separator made in accordance with the invention.

A lead-acid storage battery comprises one or more cells each containing alternately adjacent positive and negative plates immersed in sulphuric acid; the positive plates comprising lead alloy grids packed with active paste material consisting chiefly of lead peroxide, and the negative plates with active paste consisting chiefly of sponge lead. Adjacent plates of each cell are kept out of electrical contact by means of separators usually made of plate form.

The separators should be ideally highly permeable to the battery liquid, so as to provide for optimum electrical transmission and liquid circulation throughout the battery cells. Also, of course, the separators must be of optimum acid resistance, while at the same time relatively inexpensive to manufacture and rugged to insure long life. Several types of separators have been previously devised, and probably the most commonly employed base material is wood. A particularly suitable type of wood for the purpose is known as Port Orford cedar, inasmuch as this wood has an outstanding reputation for resistance to chemical attack by sulphuric acid and by the active paste material which is used in the positive plates. In recent years, however, this type wood has become increasingly scarce, and less desirable forms of wood such as Douglas fir have been used; but battery separators constructed of such materials have shown appreciably shorter life characteristics.

In lieu of wood, certain other materials have been tested for separator manufacturing purposes. For example, separators have been manufactured in the form of microporous rubber plates, but such separators cost about three times as much as the separators of the present invention. Other substitute materials such as glass fiber mats and fabrics have been tested for the purpose, but have proven disadvantageous because of the expense of manufacture thereof and because of their failure to provide optimum electric current and liquid circulation. Also, separators made from such materials are invariably of too large pore size and therefore fail to adequately separate the battery plates and permit short-circuiting therebetween.

In view of the circumstances set forth hereinabove efforts have been made to devise means for employing the more readily available and inexpensive type woods such as Douglas fir as the basic ingredient of separator constructions for the purpose described; and to treat such woods in some manner as to enhance its resistance to chemical attack by the battery acid and by the positive plate active paste material. For example, research has revealed that many batteries have failed because the active material of the positive plate corroded the wood separators to such an extent as to perforate the latter and to introduce internal battery short circuits. Thus, it has been attempted to employ a punched rubber sheet between the battery positive plate and the wood separator to protect the wood from chemical attack, but this method was found to be quite expensive and impractical because it does not seem to be possible to make the rubber sheet porous enough to pass electric currents therethrough at high rates, without serious loss of voltage. Another attempt to solve the problem involved the use of glass fiber mats placed between the positive plates and the wood separators. This method was found to be practical and has been used to date in many batteries but is nevertheless relatively expensive and involves a troublesome additional step in the assembly of storage batteries such as is particularly disadvantageous in connection with large production type operations.

Still another attempt to solve the problem was discussed in U. S. Patent 1,185,058 issued May 30, 1916 to R. N. Chamberlain, an employee of the Gould Storage Battery Company, a predecessor of the assignee of this present patent application. In the Chamberlain patent it was suggested that a wood separator be coated at its rib portions by a relatively hard acid-resistant material. It is known that at the time of the Chamberlain work in the subject, no porous acid-resistant materials suitable for this purpose were available; and it is known that the materials with which he worked were such as to produce high electrical resistance and consequently low battery capacity and voltage. Also, he apparently knew of no material at that time which would remain tightly adherent to the wood plates during the subsequent treatment of such plates with caustic soda, as is now required standard practice in order to open the wood pores and remove potentially harmful gums, resins, acids, etc., from the wood before being incorporated in a battery. It is of particular importance to note that once a wood separator plate has been caustic-treated and washed, it cannot be thereafter dried without damage. Therefore, it is impractical to attempt to first caustic-treat a wood plate, and then to dry it preliminary to coating it.

As stated hereinabove, inasmuch as the same acid-resistant type woods are now becoming relatively scarce and unavailable, it has now become extremely important to devise a suitable wood plate protective mechanism in the problem which has been set forth hereinabove, and a very substantial program of research has been completed by the present applicant for patent on behalf of the assignee herein, before discovery of my practical solution to the problem. As a result of this research it was determined that a satisfactory separator fabrication may be constructed to comprise a base formed of a suitable ligno-cellulose material such as natural wood; a wood conversion product; a vegetable fiber mat; or the like; provided such base material is treated with means for preserving the ligno-cellulose structure against destruction through corrosive contact action with the materials of the positive plate.

For example, it has been determined that a dry wood separator may be painted or immersed in a water-emulsion of vinylidine chloride type plastic, so that the water-emulsion paint penetrates the surface and adheres to the wood so that subsequent to application of the plastic the separator may be treated with caustic soda for the purposes explained hereinabove, without loosening the plastic film. It was also determined, however, that an application of pure plastic material of the type referred to would render the treated surfaces relatively impervious to passage of electric currents and to circulation of battery liquids. Therefore, research was conducted to determine how to render such plastic coating permeable in the sense referred to, and it was finally determined that a battery separator of superior qualities could be produced by; first, preparing a wood piece of the desired dimensions and configurations; and then coating it at the positive plate contacting surfaces thereof with a paint comprising a mixture of a plasticized vinylidine chloride emulsion and an acid-resistant pigment or filler such as finely powdered silica, or some other suitable natural or synthetic acid-resistant material.

It was determined that the relative proportions of the ingredients of the paint mixture and the solids-to-liquid ratios thereof are critical in order to obtain a coating of the required texture; and after considerable research it was discovered that the desired results were obtained for example by the following process. Ten parts (by weight) of a plasticized vinylidine chloride emulsion (such as is commercially available under the trade-names Saran latex or Geon latex) were mixed with ten parts of finely powdered silica and four parts of water. The paint so produced was then brushed upon the rib surfaces of dry Douglas fir separator plates, and allowed to dry either naturally or under accelerated conditions by treatment under infra red radiant heater rays for a few minutes. In the drawing, the wood base is designated 1 and the applied coating is designated 2. The thickness of the paint film after drying was noted to be approximately .003". The dry separators were then placed in a caustic treating bath comprising a .75% sodium hydroxide solution in water. The separators were boiled in this solution for four hours, and then reboiled in a fresh solution of the same composition for another seven hours. The de-resinified, porous separators were then drained and washed in successive batches of boiling water until the caustic soda had been substantially removed, whereupon the separators were ready for installation in a storage battery.

The advantages of the invention are that it cheaply produces a separator having a degree of porosity practically equal to that of an unpainted wood separator, while the life of the separator of the invention in a storage battery is more than double that of an untreated wood separator. A further advantage of this separator is that it requires no additional step or labor in connection with its assembly within the battery case. It is, therefore, very close to Port Orford cedar separators in cost; permits the use of Douglas fir which is abundantly available; and possesses a service life equivalent to that of a microporous rubber separator.

The invention also contemplates application of the coating material of the invention to cedar wood base material as well as to the cheaper wood materials referred to hereinabove in the manufacture of separator plates in order to enhance the natural resistance of the wood to corrosion and to thereby increase the battery life.

I have also observed that diatomaceous earth also a siliceous material may be substituted for finely ground silicia in the paint application, especially if the resin-to-pigment ratio is increased, whereupon a satisfactory paint may be obtained. However, the high cost of resin makes this later type composition less desirable. It was also observed that instead of coating only the separator ribs, the entire surface may be coated and an acceptable separator thereby produced.

I claim:

1. A diaphragm for an electro-chemical cell comprising a porous ligno-cellulose base material and a film coating attached thereto at a surface portion thereof of a mixture consisting of plasticized vinylidine chloride and an acid-resistant powdered solid contained therein, said coating and diaphragm being porous.

2. A storage battery separator diaphragm comprising a porous, caustic-treated ligno-cellulose base material and a film coating attached thereto at restricted surface portions thereof of a mixture consisting of plasticized vinylidine chloride and a powdered siliceous filler material contained therein, said coating and diaphragm being porous.

3. A porous diaphragm for an electro-chemical cell comprising a porous, caustic-treated ligno-cellulose base material and a coating attached thereto at a surface portion thereof of a porous film of plasticized vinylidine chloride mixed with diatomaceous earth.

4. A porous diaphragm for an electro-chemical cell comprising a ligno-cellulose base material and a coating attached thereto at its rib surfaces of a porous film consisting of a mixture of plasticized vinylidine chloride and an acid-resistant powdered solid contained therein.

5. A diaphragm for an electro-chemical cell comprising a ligno-cellulose base material and a porous coating attached thereto at surface portions thereof of a mixture of substantially equal parts of acid-resistance vinylidine chloride resin and powdered silica.

EUGENE WILLIHNGANZ.

REFERENCES CITED

The following references are of record in the file of this patent:

UNITED STATES PATENTS

| Number | Name | Date |
|---|---|---|
| 419,858 | Lee | Jan. 21, 1890 |
| 1,185,058 | Chamberlain | May 30, 1916 |
| 1,566,826 | Chamberlain | Dec. 22, 1925 |
| 1,942,667 | Smith | Jan. 9, 1934 |
| 2,001,421 | Haunz | May 14, 1935 |
| 2,053,058 | Wuillot | Sept. 1, 1936 |
| 2,155,016 | Kershaw | Apr. 18, 1939 |
| 2,174,132 | Maisch | Sept. 26, 1939 |
| 2,195,134 | Rasch | Mar. 26, 1940 |
| 2,431,745 | Flanagan | Dec. 2, 1947 |

FOREIGN PATENTS

| Number | Country | Date |
|---|---|---|
| 805,011 | France | Nov. 9, 1936 |

OTHER REFERENCES

Geon, "Resins and Plastics for Calender and Solution Processing," Chemical Division, B. F. Goodrich Company, Akron, Ohio, Technical Bulletin PM 2, May 15, 1944, 2 pages, page 1 and 2.